(12) United States Patent
Goodsitt et al.

(10) Patent No.: US 10,263,996 B1
(45) Date of Patent: Apr. 16, 2019

(54) DETECTING FRAUDULENT USER ACCESS TO ONLINE WEB SERVICES VIA USER FLOW

(71) Applicant: Capital One Services, LLC, McLean, VA (US)

(72) Inventors: Jeremy Edward Goodsitt, Champaign, IL (US); Austin Grant Walters, Savoy, IL (US); Fardin Abdi Taghi Abad, Champaign, IL (US); Reza Farivar, Champaign, IL (US); Anh Truong, Champaign, IL (US); Vincent Pham, Champaign, IL (US); Mark Louis Watson, Urbana, IL (US); Kenneth Taylor, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/102,367

(22) Filed: Aug. 13, 2018

(51) Int. Cl.
| | |
|---|---|
| *G06F 11/00* | (2006.01) |
| *G06F 21/60* | (2013.01) |
| *H04L 29/06* | (2006.01) |
| *G06F 16/955* | (2019.01) |

(52) U.S. Cl.
CPC ........ *H04L 63/104* (2013.01); *G06F 16/9558* (2019.01); *H04L 63/102* (2013.01); *H04L 63/1408* (2013.01); *H04L 63/1425* (2013.01)

(58) Field of Classification Search
CPC . H04L 63/102; H04L 63/104; H04L 63/1425; G06F 21/577; G06F 17/30876; G06F 17/30882
See application file for complete search history.

(56) References Cited

U.S. PATENT DOCUMENTS

| | | | | |
|---|---|---|---|---|
| 8,180,886 | B2 * | 5/2012 | Overcash | H04L 63/1425 709/224 |
| 8,356,001 | B2 * | 1/2013 | Collazo | G06F 21/577 706/14 |
| 8,548,991 | B1 * | 10/2013 | Zamir | G06F 16/9535 707/723 |

(Continued)

OTHER PUBLICATIONS

Splunk and Tensorflow for Security: Catching the Fraudster with Behavior Biometrics; Posted by Gleb Esman; https://www.splunk.com/blog/2017/04/18/deep-learning-with-splunk-and-tensorflow-for-s . . . ; retrived on Aug. 10, 2018.

(Continued)

*Primary Examiner* — Linglan E Edwards

(57) ABSTRACT

Techniques to detect unauthorized access and/or use of a user's account provided by an online web service are provided. A user's activity on the online web service can be monitored to determine a model of the user flow through the online web service. The model of user flow can be unique to the user or can be a model assigned to a cluster of users having similar behaviors or mannerisms when navigating the online web service. The model can vary based on the type of device used by the user to access the online web service. Once a model is determined, subsequent activity on the online web service by the user can be monitored and compared to the model of user flow. Unauthorized access and/or use of the user's online account can be detected if the subsequent activity fails to fit the model of the user flow.

17 Claims, 10 Drawing Sheets

(56) References Cited

U.S. PATENT DOCUMENTS

| | | | |
|---|---|---|---|
| 8,621,615 B2 * | 12/2013 | Zhao | H04L 43/00 |
| | | | 370/252 |
| 8,650,080 B2 | 2/2014 | O'Connell et al. | |
| 8,914,362 B1 * | 12/2014 | Zamir | G06F 16/9535 |
| | | | 707/732 |
| 9,021,583 B2 * | 4/2015 | Wittenstein | G06F 21/554 |
| | | | 726/22 |
| 9,185,095 B1 * | 11/2015 | Moritz | H04L 63/102 |
| 9,213,990 B2 * | 12/2015 | Adjaoute | G06Q 20/4016 |
| 9,311,476 B2 * | 4/2016 | Stolfo | G06F 21/55 |
| 9,418,221 B2 | 8/2016 | Turgeman | |
| 9,514,293 B1 * | 12/2016 | Moritz | H04L 63/102 |
| 9,516,035 B1 * | 12/2016 | Moritz | H04L 63/102 |
| 9,541,995 B2 * | 1/2017 | Turgeman | G06N 5/04 |
| 9,639,699 B1 * | 5/2017 | Kurupati | G06F 21/566 |
| 9,665,703 B2 * | 5/2017 | Turgeman | G06F 21/32 |
| 10,003,608 B2 * | 6/2018 | Treat | H04L 63/1425 |
| 10,091,180 B1 * | 10/2018 | Moritz | H04L 63/08 |
| 2010/0299292 A1 * | 11/2010 | Collazo | G06F 21/577 |
| | | | 706/14 |
| 2012/0204257 A1 | 8/2012 | O'Connell et al. | |
| 2015/0206214 A1 * | 7/2015 | Adjaoute | G06Q 20/4016 |
| | | | 705/26.35 |
| 2016/0142534 A1 | 5/2016 | Guerra et al. | |
| 2016/0247158 A1 | 8/2016 | Kolotinsky | |
| 2016/0253486 A1 * | 9/2016 | Sarkar | G06F 21/316 |
| | | | 726/7 |
| 2016/0321689 A1 | 11/2016 | Turgeman | |
| 2017/0289168 A1 * | 10/2017 | Bar | H04L 63/0853 |
| 2018/0077187 A1 * | 3/2018 | Garman | G06F 17/30864 |

OTHER PUBLICATIONS

Feher et al., "User Identity Verification via Mouse Dynamics", Deutsche Telekom Laboratories at Ben-Gurion University & Department of Information Systems Engineering, 34 pages.

* cited by examiner

DETECTING FRAUDULENT USER ACCESS TO ONLINE WEB SERVICES VIA USER FLOW

TECHNICAL FIELD

Embodiments described herein generally relate to security of a user's account for an online web service.

BACKGROUND

Many conventional online web services provide security to a user by requiring the user to provide a username and password before granting access to the user's account. This conventional security technique has many weaknesses. For example, if an unauthorized user acquires the authorized user's username and password, the unauthorized user can gain access to the authorized user's account without detection by posing as the authorized user. Further, once being granted access to the authorized user's account, the unauthorized user can interact with the online web service without being subject to any other security mechanism.

Other conventional online web services provide additional security by comparing activity on an authorized user's account to known fraudulent or unauthorized activity. For example, after verifying a user's logon information and granting a user access to a secure online account, certain conventional online web services may compare activity on the account to known bot activity or known fraudulent activity implemented by a human user. While providing some heightened security, these conventional security mechanisms also have multiple weaknesses leaving authorized users exposed to sophisticated hacking and fraudulent activity.

Accordingly, there is a need to protect a user's account on an online web service using improved security and authentication techniques.

DETAILED DESCRIPTION

This disclosure presents various systems, components, and methods related to detecting unauthorized access to an online web service by user flow. Each of the systems, components, and methods disclosed herein provides one or more advantages over conventional systems, components, and methods.

Various embodiments include techniques to detect unauthorized access and/or use of a user's account provided by an online web service. A user's activity on the online web service can be monitored to determine a model of the user flow through the online web service. The model of user flow can be unique to the user or can be a model assigned to a cluster of users having similar behaviors or mannerisms when navigating the online web service. The model can vary based on the type of device used by the user to access the online web service. Once a model is determined, subsequent activity on the online web service by the user can be monitored and compared to the model of user flow. Unauthorized access and/or use of the user's online account can be detected if the subsequent activity fails to fit the model of the user flow. Other embodiments are disclosed and described.

Figure 1:
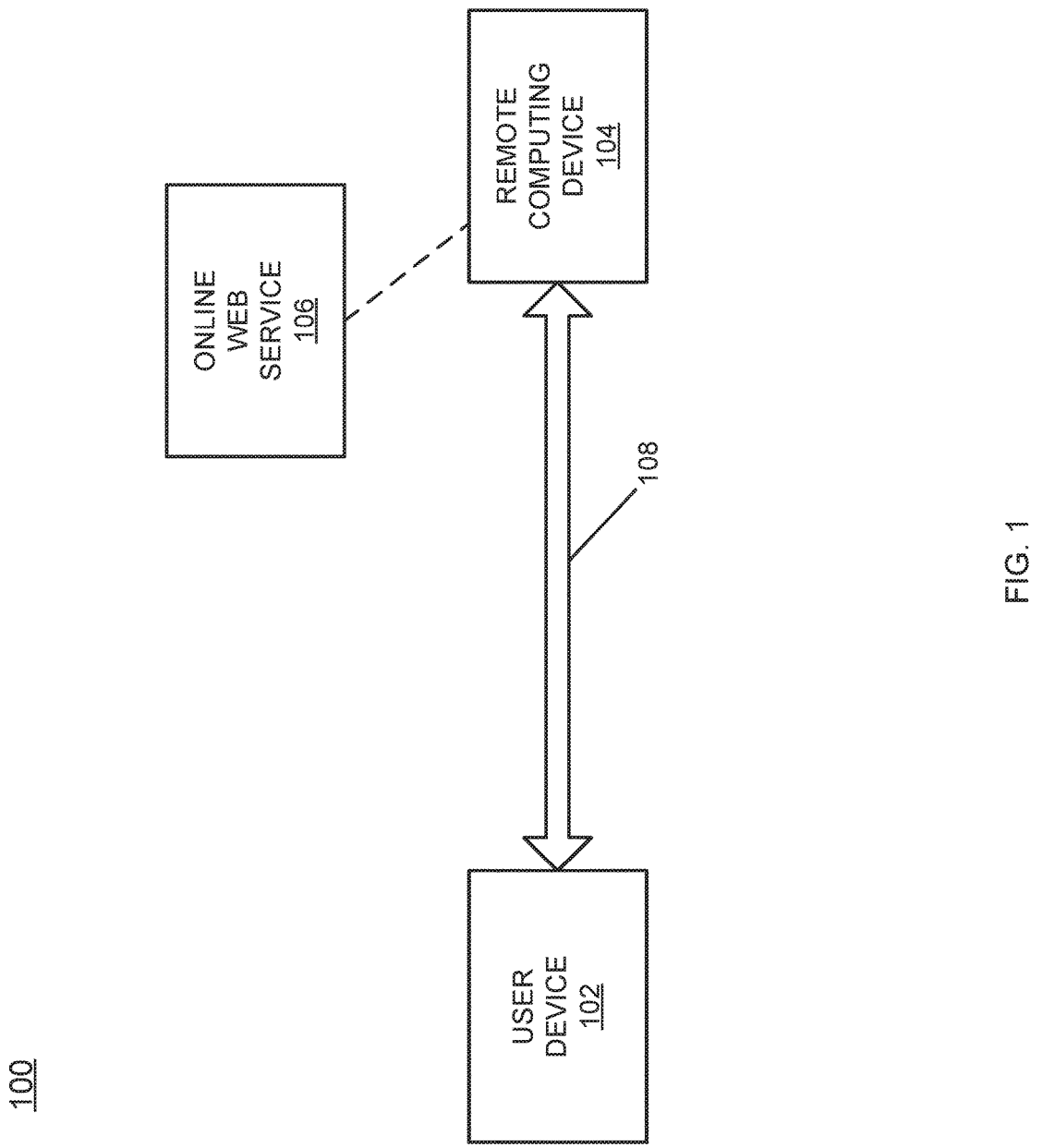
FIG. 1 illustrates an operating environment.

FIG. 1 illustrates an operating environment 100 such as may be representative of various embodiments in which techniques for detecting unauthorized access to an online web service through user flow are implemented. The operating environment 100 can include a user device 102 and a remote computing device 104. The user device 102 can be any type of computing device including, for example, a desktop computer, a mobile computing device, a tablet, or a smartphone. The remote computing device 104 can be any type of computing device including a computing device operating as a web server, a host computing system, or other network management computing device. The remote computing device 104 can store, process, and deliver web pages to clients including, for example, the user device 102 based on, for example, requests or selections received from the user device 102.

In various embodiments, the remote computing device 104 can host an online web service 106. The online web service 106 can be any type of website or application accessible over, for example, the Internet. The remote computing device 104 can respond to requests and/or inputs from the user device 102 (e.g., as received by the remote computing device 104) to present the online web service 106 and/or any of the functionality of the online web service 106 to the user device 102. In various embodiments, the online web service 106 can be, for example, a website to facilitate access to an online banking account, an online insurance account, or any other online service. In various embodiments, the online web service 106 can require a user of the user device 102 to provide authentication information to access and/or view content available on the online web service 106 such as, for example, content specific to the user.

In various embodiments, the user device 102 and remote computing device 104 can communicate and/or share any data or information over a communication link 108. The communication link 108 can comprise one more computer networks or links. The communication link 108 can include, for example, one or more wireless communication systems that operate according to one or more wireless communication standards or protocols over any frequency band or range. The communication link 108 can include, for example, one or more wired communication systems that operate according to one more wired communication standards or protocols over any type of wired media. The user device 102 and the remote computing device 104 can communicate according to any computer network protocol including any Internet-related communication protocol to facilitate the presentation and interaction of the online webs service 106 between the user device 102 and the remote computing device 104.

In various embodiments, the online web service 106 can be a website that provides access to secure content of a user of the user device 102. In various embodiments, the online website 106 can require a user of the user device 102 to be authenticated prior to being provided access to the secure content. In various embodiments, the authentication can include verifying a user name and password and/or can include a two-factor authentication process. In general, a user of the user device 102 can provide information to the remote computing device 104 to enable the remote computing device 104 to verify the identity of the user. Once the identity of the user is verified, the user is provided access to secure content stored and capable of presentation by the online web service 106 as managed by the remote computing device 104.

As an example, in various embodiments, the online web service 106 can be an online website for a bank for which the user of the user device 102 is a customer and/or has an online account for accessing the online bank website. To access secure banking information of the user, the user can provide authentication information to the remote computing device 104 by way of the user device 102 and the communications link 108. The remote computing device 104 can receive the authentication information (e.g., a user name and password for the user) and can compare the authentication information to stored information for the user. If the received authentication information corresponds or matches the stored authentication information for the user, then the remote computing device 104 can provide access to secure content or information to the user as presented on the user device 102.

In various embodiments, the secure content or information can include webpages or information available beyond an initial authentication logon webpage.

Additionally, as an example, the user of the user device 102 can be presented with a first or initial webpage of the online web service 106 that requests or includes fields for a user to enter his username and password. After providing the authentication information, and after verification of the authentication information, the remote computing device 104 can authorize the online web service 106 to provide certain secure information to the user. Further, certain functionality of the online web service 106 can be provided after authentication. In this way, the user can access an account (e.g., a secure account of the user) provided by the online web service 106.

In various embodiments, the secure information and/or functionality can include, for example, balances of one or more bank accounts for the user, the ability to issue payments to a company, service, or individual, the ability to transfer money across bank accounts or to outside bank accounts, order checks, view transactional data for an account, etc. In various embodiments, the secure information and/or functionality can be unique and/or customizable to a particular user. Accordingly, once a user is authenticated, the online web service 106 may provide information and/or functionality to a user that is personal or specific to a user and can be considered to be a user's personalized online web service 106 experience.

Conventional authentication systems may not provide robust protection against unauthorized user access to a user's personalized online web service 106 experience. For example, unauthorized users or hackers may gain access to a user's username and password. As a result, an unauthorized user may be able to gain access to the user's secure information or functionality, without knowledge of the user and without the remote computing device 104 and/or the online web service 106 realizing that a user other than the authorized user is interacting with the user's personalized online web service 106 experience. This can enable the unauthorized user to, for example, steal or transfer funds without knowledge of the user.

Accordingly, such conventional authentication systems may provide weak protection for a user as the only mechanism related to security is a logon verification process that involves checking a user name and password for a user. Such a conventional authentication system only verifies the user at the time of requested access to the user's secure content or information and fails to provide any protection or verification mechanism thereafter. Specifically, no authentication mechanism is provided during the use of the online web service 106 after access to any secure content or functionality is provided. As a result, an unauthorized user can gain access to a user's secure content or functionality and operate within the online web service 106 with impunity as any subsequent activity after the initial authentication process is not monitored or evaluated to guard against unauthorized access.

Techniques disclosed herein enable the remote computing device 104 providing the online web service 106 to monitor activity or use of the online web service 106 by a user from the user device 102 to verify (e.g., continually) the user is indeed an authorized user of the online web service 106 (e.g., or truly the user that was verified and provided access to secure content of the online web service 106). The remote computing device 104 can continually monitor the user's activity, use, and/or manipulation of the online web service 106 after the user has logged on or been verified to use the online web service 106. The remote computing device 104 can compare the user's activity to a model of the user's activity or flow through the online web service 106. The model of the user's activity or flow through the online web service 106 can be generated based on prior activity of the user of the online web service 106.

In various embodiments, the remote computing device 104 can track and/or monitor a user's use of the online web service 106 over any number of sessions during which the user interacts with the online web service 106 through the user device 102. The sessions can each be separate or distinct sessions with each session beginning after the user participates in an authentication scheme for attempting to verify the identity of the user. The authentication scheme can be any authentication scheme including entry of a username and password, a two-factor authentication scheme, and/or any authentication scheme that requires other input by the user such as a verbal input. After the authentication scheme or mechanism determines that the user of the user device 102 is verified or authorized to be provided with secure information or content of the online web service 106, the remote computing device 104 can monitor (e.g., continuously) the activity and/or actions of the user as the user uses the online web service 106 as provided by the remote computing device 104 in response to manipulations of the user device 102.

The actions tracked by the remote computing device 104 can be any actions the user can make in relation to the online web service 106 as presented or provided to the user on the user device 102 by the remote computing device 104. In various embodiments, the actions or activity can be, for example, mouse movements, speed of mouse, speed between clicks, links clicked on a by a user, forms or fields filled out by a user, information copied, typing, mistakes or corrections of typed mistakes, and idiosyncratic behaviors such as wiggling a mouse or scrolling. Further, in various embodiments, the actions or activity can include a user's flow through the online web service 106. The user's flow can include, for example, a sequence of links typically selected by the user, the speed at which the links are selected, and/or a typical set of actions implemented by the user.

By monitoring a user's actions and/or flow through the online web service 106, for example over a number of discrete sessions with the online web service 106, the remote computing device 104 can develop or generate a model of a user's behavior or mannerisms. Further, the remote computing device 104 can develop a model of the user's flow through the website. In various embodiments, each discrete session can include activities by the user after authentication is verified until the user exits or logs off from the online web service 106. When the user logs on again, and is verified, a subsequent user interaction session can occur. After a certain number of discrete user interaction sessions, the model of user behavior and/or flow can be generated.

Once the model of user behavior and/or flow is generated, the remote computing device 104 can compare subsequent activity on the online web service 106 by the user to the model. When the user's activity deviates significantly from the model, the activity can be flagged. For example, the activity can be flagged as being caused by someone other than the actual user such that the activity can be considered fraudulent or unauthorized. In turn, a determination that the activity is unauthorized can cause the remote computing device 104 to revoke access to the online web service 106 by the user. Other protective actions can be taken as well, such as alerting law enforcement authorities or attempting to contact the actual authorized user.

The model of the user's behavior and flow through the online web service 106 can be updated and/or modified during each user's interaction with the online web service 106 for which no determination of unauthorized activity is made. In this way, the accuracy and reliability of the user model can be improved. In various embodiments, the model developed for a user can be unique to a particular user. That is, for each user that accesses and uses the online web service 106 (e.g., a group of users having an account with the online web service 106), a unique customized model can be generated. The unique model can then be used to compare to subsequent activity on the online web service 106 by an individual granted access to the online web service 106 as the user (e.g., and whose activity during any subsequent session is monitored to verify the authentication or grant of access was correct and accurate and/or that the identity of the user was correctly determined).

In various embodiments, the model developed for a user can be a model assigned to one or more users of the online web service 106. For example, users of the online web service 106 can be grouped into different classifications or types of users, or clusters. A single model can then be assigned to each user within the same cluster, which each different cluster assigned a different model. In this way, users within the same cluster or classification can share a model. Users with similar mannerisms or behaviors when navigating the online web service 106, or similar flows through the online web service 106, can be grouped together into the same cluster.

In various embodiments, the model developed for a user can be based on the type of the user device 102 used by the user for accessing the online web service 106. In various embodiments, the remote computing device 104 can detect the type of the user device 102 (e.g., mobile device, desktop device, or tablet) and can compare the user's activity to a model specific to the determined type of the user device 102. For example, when a user uses a smartphone as the user device 102, a first model can be used for comparison to the user's activity and, when the user uses a desktop as the user device 102, a second model can be used for comparison to the user's activity. The first and second models can be either unique, customized models specific to the user or can be group models assigned to two or more users. Each model for a user can be developed after a certain number of sessions on the online web service 106 by the user on a certain type of the user device 102.

In various embodiments, the remote computing device 104 manages presentation of the online web service 106 and monitoring of use of the online web service 106 for many users. In various embodiments, any number of users (e.g., tens of thousands or hundreds of thousands) can be using the online web service 106 at any one. Accordingly, in various embodiments, the remote computing device 104 can be designed and operated to receive and process communications from multiple users regarding requests for navigating through the online web service 106, including retrieving stored content and transmitting it to the users, while also monitor each user's activity and storing data indicative of each user's navigation and flow through the online web service 106. Further, in various embodiments, the remote computing device 104 can be designed and operated to also compare the stored tracked data for each user to a model assigned or developed for each user to repeatedly compare each user's navigation through the online web service 106 to a model of the flow for each corresponding user.

Figure 2:
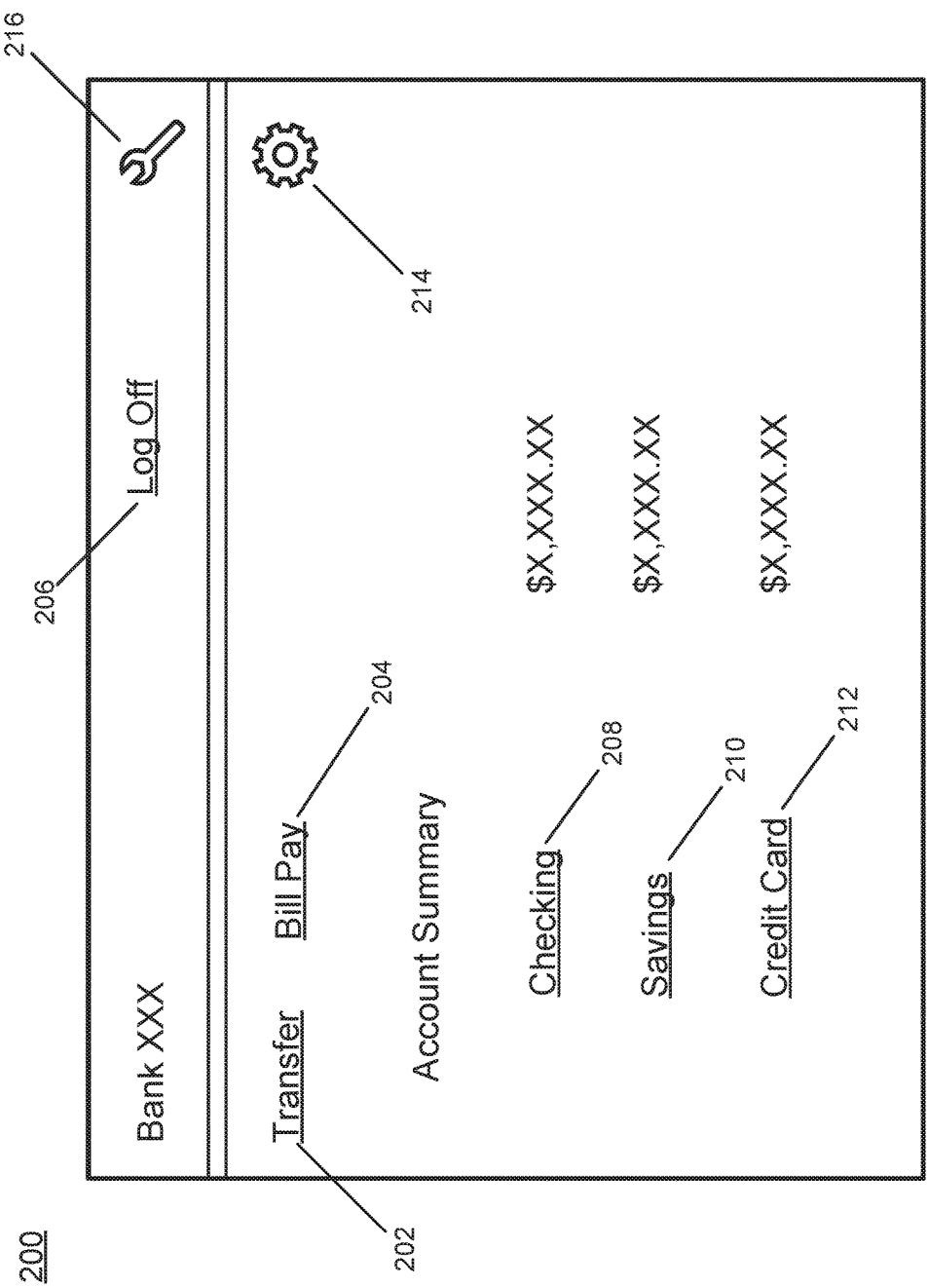
FIG. 2 illustrates a first webpage presented by an online web service depicted in FIG. 1.

FIG. 2 illustrates a first webpage 200 presented by the online web service 106. The webpage 200 can be one of a number of webpages that can be presented to the user on the user device 102 by the remote computing device 104. The webpage 200 can include any number of textual portions and/or icons or other graphical elements that the user can interact with and/or click on. When a user clicks on a portion of the webpage 200 that is linked to another webpage or action, the remote computing device 104 can present the selected webpage and/or action to the user in response thereto. The webpage 200 can represent a webpage presented to the user after the user has provided login information to an initial webpage of the online web service 106 (e.g., a splash page or login page). The webpage 200 can be the first webpage presented to the user after the authentication process for verifying the user. As an example, the webpage 200 can be a webpage of an online banking service as provided by the online web service 106.

In various embodiments, the webpage can include textual links 202-212. The textual links 202-206 can be positioned across a top of the webpage 200. The textual link 202, for example, can allow a user to request a webpage that the user can interact with to enable the user to make a transfer of user funds. The textual link 204, for example, can allow a user to request a webpage that the user can interact with to enable the user to issue an electronic bill payment to a payee. The textual link 206, for example, can allow the user to request logging off from the online banking site provided by the online web service 106.

The textual links 208-212 can be positioned vertically down the webpage 200. The textual link 208, for example, can allow the user to request a webpage that the user can interact with to enable the user to review transactional information related to a first account (e.g., a checking account). The textual link 210, for example, can allow the user to request a webpage that the user can interact with to enable the user to review transactional information related to a second account (e.g., a savings account). The textual link 212, for example, can allow the user to request a webpage that the user can interact with to enable the user to review transactional information related to a third account (e.g., a credit card or credit account).

The icon link 210, for example, can allow a user to request a webpage that the user can interact with to enable the user to request support related to the user's online account. The icon link 212, for example, can allow the user to request a webpage that the user can interact with to enable the user to request a modification to the presentation of the online account. In various embodiments, the links 202-216, when selected by the user (e.g., clicked on by a mouse coupled to the user device 102), can navigate the user to another webpage. In various embodiments, the links 202-216 can present or open a menu (e.g., a drop-down menu) to the user on the existing webpage 200.

In various embodiments, by selecting or clicking a link 202-216, the user device 102 can send a transmission to the remote computing device 104. The transmission can include data indicative of the selected link. The remote computing device 104 can receive the transmission and processes the included data to determine the link selected by the user. After determining the link, the remote computing device 104 can retrieve stored information related to the website, action, menu or other feature of the online web service 106 associated with the selected link. The remote computing device 104 can then transmit the retrieved information to the user device 102. The information provided by the remote computing device 104 can then be processed by the user device 102 for rendering on a display device for viewing by the user. The user can then view and interact with the newly presented information. Transmission can be made over the communications link 108. The user device 102 and the remote computing device 104 can operate according to one or more computer network protocols to facilitate navigation through the online web service 106.

Each coupled webpage or menu or other item presented to the user after clicking or selecting one of the links 202-216 can present the user with another set of selectable links to provide a nested set of webpages and actions as available to the user through the online web service 106. By clicking or selecting any set or sequence of the available webpages and/or actions and/or menus, the user navigates through the online web service 106 using the user device 102. In various embodiments, the remote computing device 104, receives the selections (e.g., clicks and/or requests) and operates to provide the selected webpage, action, and/or menu (e.g., or other interaction element or feature) to the user. Collectively, the action of the user in making a series of selections can be considered to be navigating the website provided by the online web service 106.

In various embodiments, the remote computing device 104 can monitor and/or track all activity by the user as the user interacts with the online mobile service 106. In various embodiments, the remote computing device 104 can store each link selected by the user during a session with the online web service 106 including, for example, a particular sequence of links selected as well as time between each selected link. In various embodiments, the remote computing device 104 can store the selected links (e.g., any of the links 202-206 and any links selected from any nested webpages or menus, etc.), the time between each selection, as well as the total time on the online web service 106, as well as a speed of navigation (e.g., how fast the mouse is moved, how fast typing is made, etc.). In various embodiments, the remote computing device 104 can store an indication of any data manipulation operations such as any copy and/or paste operations of any data presented on any portion of the online web service 106 or for filling out data in any field presented by the online web service 106.

In various embodiments, the remote computing device 104 can store indications of any navigational information related to use of the online web service 106 by the user during each distinct session by the user—that is, during each session initiated with an authentication mechanism and then terminated before a next authenticated interaction. The indications can be stored by the remote computing device 104 for use in developing a model of the user's flow through the online web service 106 as described herein.

Figure 3:
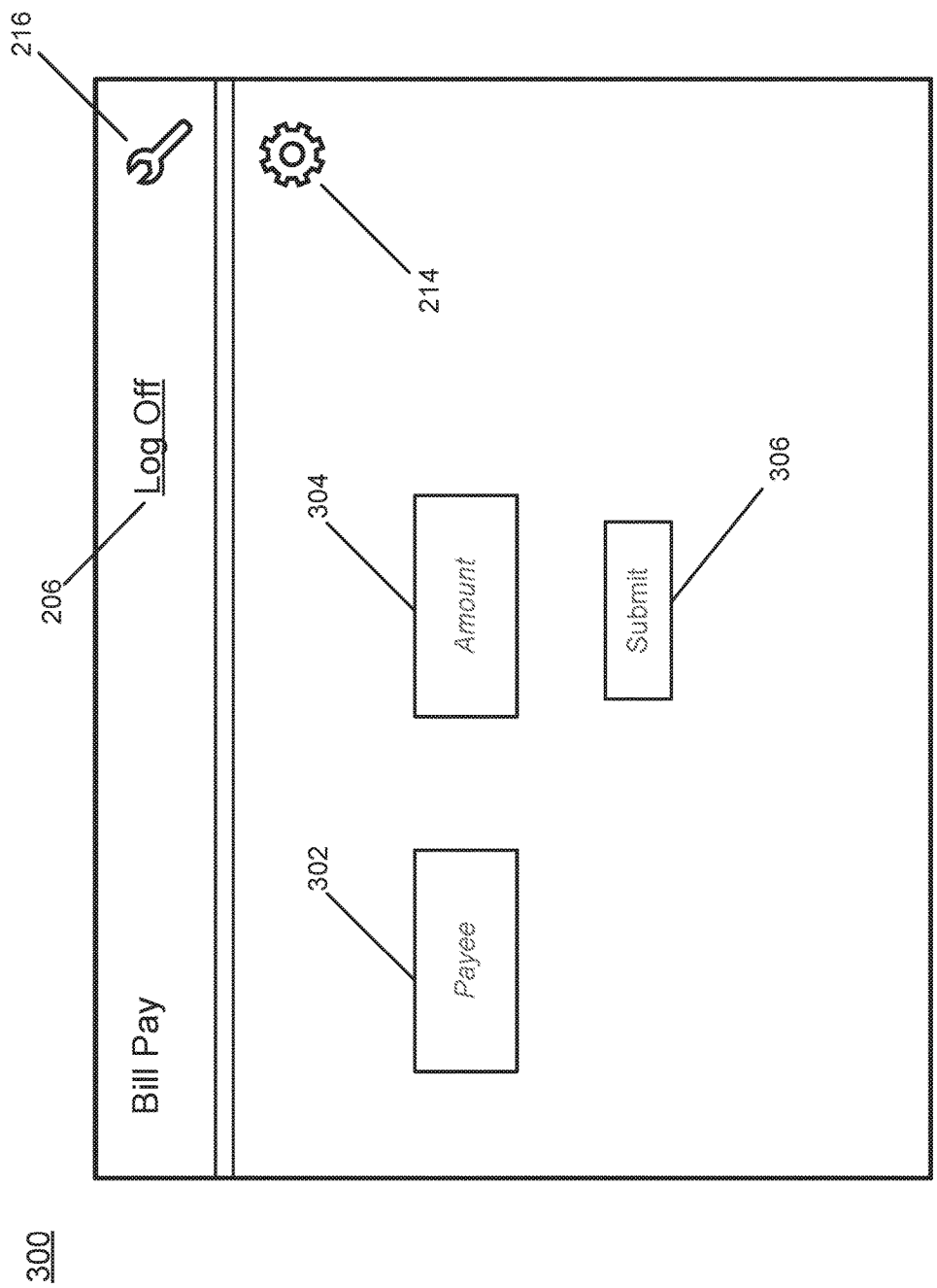
FIG. 3 illustrates a second webpage presented by the online web service depicted in FIG. 1.

FIG. 3 illustrates a second webpage 300 presented by the online web service 106. The webpage 300 can be a webpage provided to the user on the user device 102 after selection of one of the links provided on the webpage 200. As an example, the webpage 300 can be provided to the user in response to the user clicking on the link 204. As a result of an action by the user in relation to interacting with the elements presented on the webpage 200, the webpage 300 can be presented to the user. In various embodiments, the remote computing device 104 can respond to the user clicking on the link 204 by receiving a transmission from the user device 102 that includes data indicating that the link 204 was selected. The remote computing device 104 can then associate the link 204 to a webpage that is to be presented and can then retrieve all stored all elements (e.g., textual, graphical, etc.) associated with the determined webpage. These elements can then be transmitted to the user device 102 which can then process the received elements for rendering on a display of the user device 102 and enabling the user to interact with the displayed webpage.

As with the webpage 200, the webpage 300 can include graphical and textual elements including links to other webpages and/or links to menus or other actions available to the user. As an example, the webpage 300 can be a page allowing the user to instruct the online web service 106 to make a payment to a payee (e.g., to a company). Accordingly, the webpage 300 can include a data entry field 302, a data entry field 304, and an action link 306. The data entry field 302 can be a field that can be filled in by the user through a section on a drop-down menu or by the user typing in a name of a payee. The data entry field 304 can also be a field that can be filled in by the user through a selection on a drop-down menu or by the user typing in an amount of a payment. The data entered by the user in the fields 302 and 304—by any means including pre-generated menus or by typing in the data—can be received and stored (e.g., captured) by the remote computing device 104.

Accordingly, the remote computing device 104 can store data indicative of the fields filled out by the user (or fields in which data is entered by other means besides typing in a data value) during the user's session with the online web service 106. This stored data can also be used by the remote computing device 104 to develop a model of the user's flow through the online web service 106. Accordingly, this stored data can include the types of fields used by the user (e.g., data indicative of the particular fields or types of fields manipulated by the user).

In various embodiments, any data or information managed by the remote computing device 104 for presentation of any portion of the online web service 106 can be considered content, with certain content presented to the user device 102 after an authentication process has been successfully completed being considered secure content. In various embodiments, any of the links available to the user for selection can be a link to a webpage, action provided by the online web service, a menu, or any other content or feature not available to the user without selecting the link.

Figure 4:
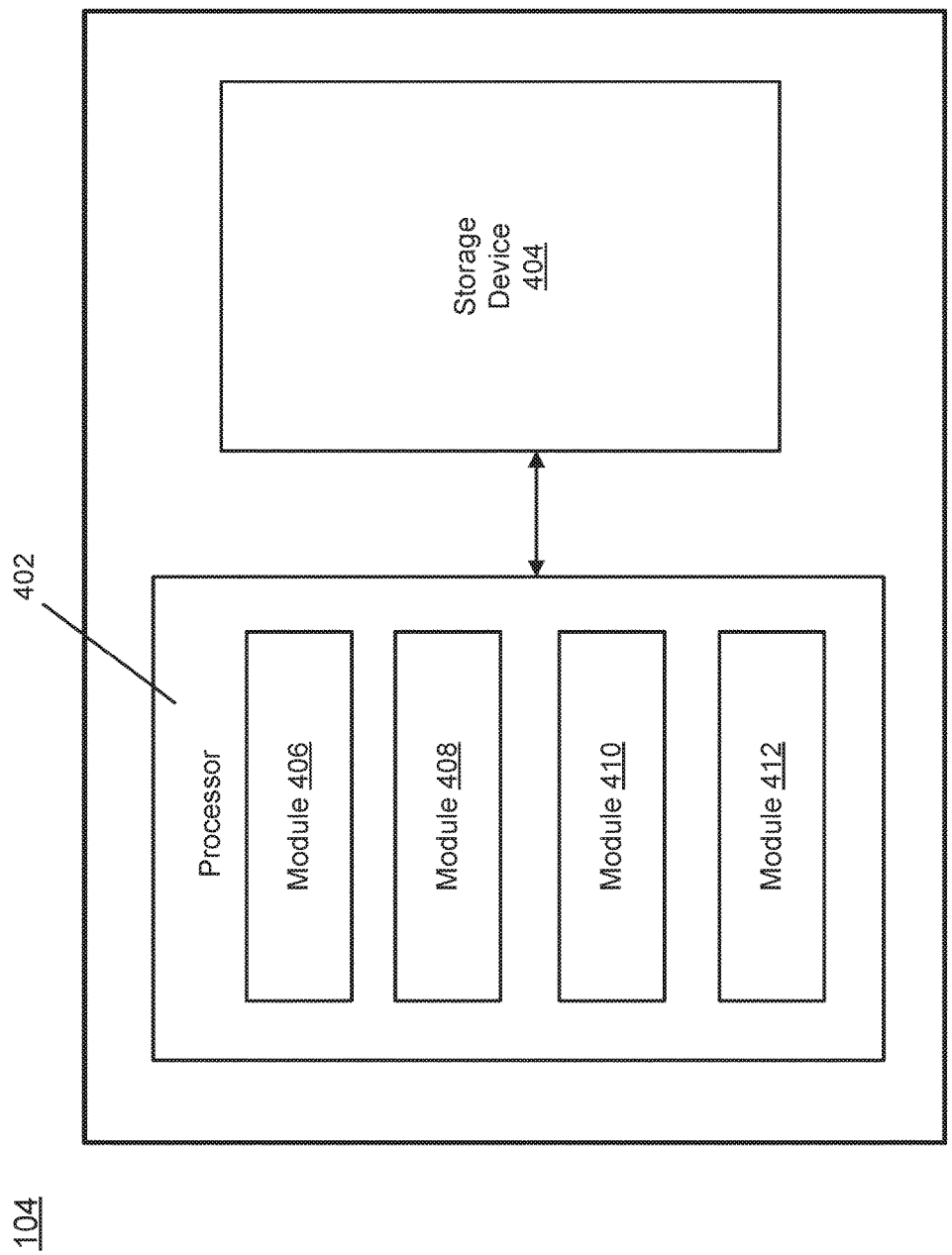
FIG. 4 illustrates an implementation of a remote computing device depicted in FIG. 1.

FIG. 4 illustrates an implementation of the remote computing device 104. As shown in FIG. 4, the remote computing device 104 can include a processor 402 and a storage device 404. The remote computing device 104 can include one or more processors and is not limited to only the processor 402. The remote computing device 104 can include one more storage devices and is not limited to only the storage device 404. The storage device 404 can be external to the remote computing device 104. The remote computing device 104 can include other components not depicted in FIG. 4 for simplicity.

The processor 402 can include an online web service module 406. The online web service module 406 can present the online web service 106 to the user of the user device 102. The online web service module 406 can receive inputs from the user (e.g., mouse manipulations, keyboard inputs, clicked links, etc.) when using the user device 102 to interact with the online web service 106. The online web service module 406 can present webpages, actions, menus, etc. in response to the inputs from the user. Any webpages and/or actions requested by the user can then be presented to the user by the online web service module 406 based on, for example, data or information stored in the storage device 404. The online web service module 406 enables the processor 402 to operate as a web server to present the user (and any other user connected to the online web service 106) with information and content stored in the storage device 404 and that can be presented to the user for display and manipulation by the user on the user device 102.

The remote computing device 104 can further include an activity tracking module 408. The activity tracking module 408 can monitor all activity and actions by a user in relation to the user's interaction with the online web service 106 as presented to the user by the online web service module 406. The activity tracking module 408 can store information (e.g., an indication of such data) relating to any links selected (e.g., clicked on) by the user when interacting with the online web service 106. The activity tracking module 408 can store information (e.g., an indication of such data) relating to any forms or fields filled in by the user. The activity tracking module 408 can store any information or data indicative thereof relating to a user's mannerisms, behavior, or flow through a website including, for example, how fast a user clicks each clink (e.g., time between link selections), what links are selected and in which order, forms filled out, mouse manipulations, data manipulation operations, etc. The information received by the activity tracking module 408 involving all aspects of a user's navigation of the online web service 106 can be stored in the storage device 404.

The remote computing device 104 can further include a user model module 410. The user model module 410 can generate a model of a user's flow and use of the online web service 106. The user model module 410 can generate the model based on data collected by the activity tracking module 408 and/or data stored in the storage device 404. In various embodiments, the model can be a model assigned to a group of users as described herein as an alternative to a user-specific model. Information regarding the model for a particular user—whether specific to the user or assigned to two or more users—can be stored in the storage device 404. In various embodiments, multiple models can be assigned to a user based on, for example, a type of the user device 102 used by the user.

The user model module 410 can build the model of the user's flow through the online web service 106 based on any information collected and/or stored by the activity tracking module 408. The user model module 410 can generate the model after a certain number of sessions have been completed by the user in interacting with the online web service 106. After multiple sessions have been completed, a more accurate model of estimate flow of the user through the online web service 106 can be made for comparison to subsequent user activity on the online web service 106 after the model has been generated. The user model module 410 can continue to modify the generated model based on subsequent information collected by the activity tracking module 408 after the initial model for the user is generated.

The remote computing device 104 can further include a user verification module 412. The user verification module 412 can compare activity of the user in relation to the online web service 106 to the model generated by the user model module 410. The user verification module 412 can use or rely on information collected by the activity tracking module 408 during user sessions with the online web service 106 after the initial model is generated. The information collected by the activity tracking module 408 during any session (e.g., subsequent user activity) can be compared to expected behavior of the user or the user's flow as predicted or expected as based on the generated model.

In various embodiments, when the user's activity in relation to interacting with the online web service 106 deviates from the model or expected flow of the user, the user verification module 412 can flag the activity as likely unauthorized or fraudulent. For example, the user verification module 412 can determine that the activity on the online web service 106 is not truly being conducted by the user—but, for example, someone other than the user that has gained access to the user's information needed to logon and/or use the online web service 106 to view or use secure content. In response, the user verification module 412 can revoke access to the online web service 106. Consequently, the online web service module 406 can be directed to stop responding to user requests and/or selections in using the online web service 106 and use of the online web service 106 can be blocked.

In various embodiments, prior to completely revoking or blocking access, the user verification module 412 can request that the user complete a verification process. For example, the user verification module 412 can request that the user complete an authentication process such as a two-factor authentication process to verify the identity of the user. If the user successfully completes the authentication process, then continued access to the user can be provided. In this way, suspected unauthorized activity that is actual activity of the allowed user can be verified through a separate manner without needlessly revoking or blocking access to the user. In various embodiments, during the time the user verification module 412 requests the user to complete the authentication process, access to the user can be temporarily frozen or can be provided without restriction. In various embodiments, the user verification module 412 can transmit a message (e.g., an email message or a text message) to a verified device or verified contact information of the user to request the authentication process be undertaken.

In various embodiments, the remote computing device 104 can be implemented as a distributed system including multiple servers or computers that interoperate to perform one or more of the processes and functionalities associated with the disclosed embodiments. In various embodiments, the remote computing device 104 can be configured with hardware and/or software modules for performing functions of disclosed methods. In various embodiments, the remote computing device 104 can include the modules 406-412 as described herein with the modules 406-412 implemented as specialized circuitry integrated within the processor 402 or in communication with processor 402, and/or specialized software executable by processor 402.

The processor 402 may be a known or custom processing device configured to perform the disclosed methods and functions described herein. The processor 402 may implement any custom or known technology to provide the ability to, for example, execute, control, run, manipulate, and store multiple software processes, applications, and/or programs. One of ordinary skill in the art would understand that various types of processor arrangements could be implemented that provide for the capabilities disclosed herein. The processor can be implemented in hardware as circuitry.

The remote computing device 104 may also include one or more input/output (I/O) devices (not shown in FIG. 2 for simplicity) that may comprise one or more interfaces for receiving signals or inputs from the user device 102 and providing signals or outputs to the user device 102. The I/O devices can also provide the capability to transmit and receive signals to any other component of the remote computing device 104 including, for example, the storage device 404. For example, the remote computing device 104 may include interface components, which may provide interfaces to one or more input devices, such as one or more keyboards, mouse devices, and the like, that enable load balancer 114 to receive input from a user or administrator (not shown in FIG. 2 for simplicity).

The remote computing device 104 may include memory that includes instructions that, when executed by processor 402, perform one or more processes consistent with the functionalities disclosed herein. The modules 406-412 may be implemented in software, hardware, firmware, or any combination thereof. The storage device 404 can be, for example, a database and can include any volatile or non-volatile, magnetic, semiconductor, tape, optical, removable, non-removable, or other type of storage device or tangible (i.e., non-transitory) computer-readable medium.

Figure 5:
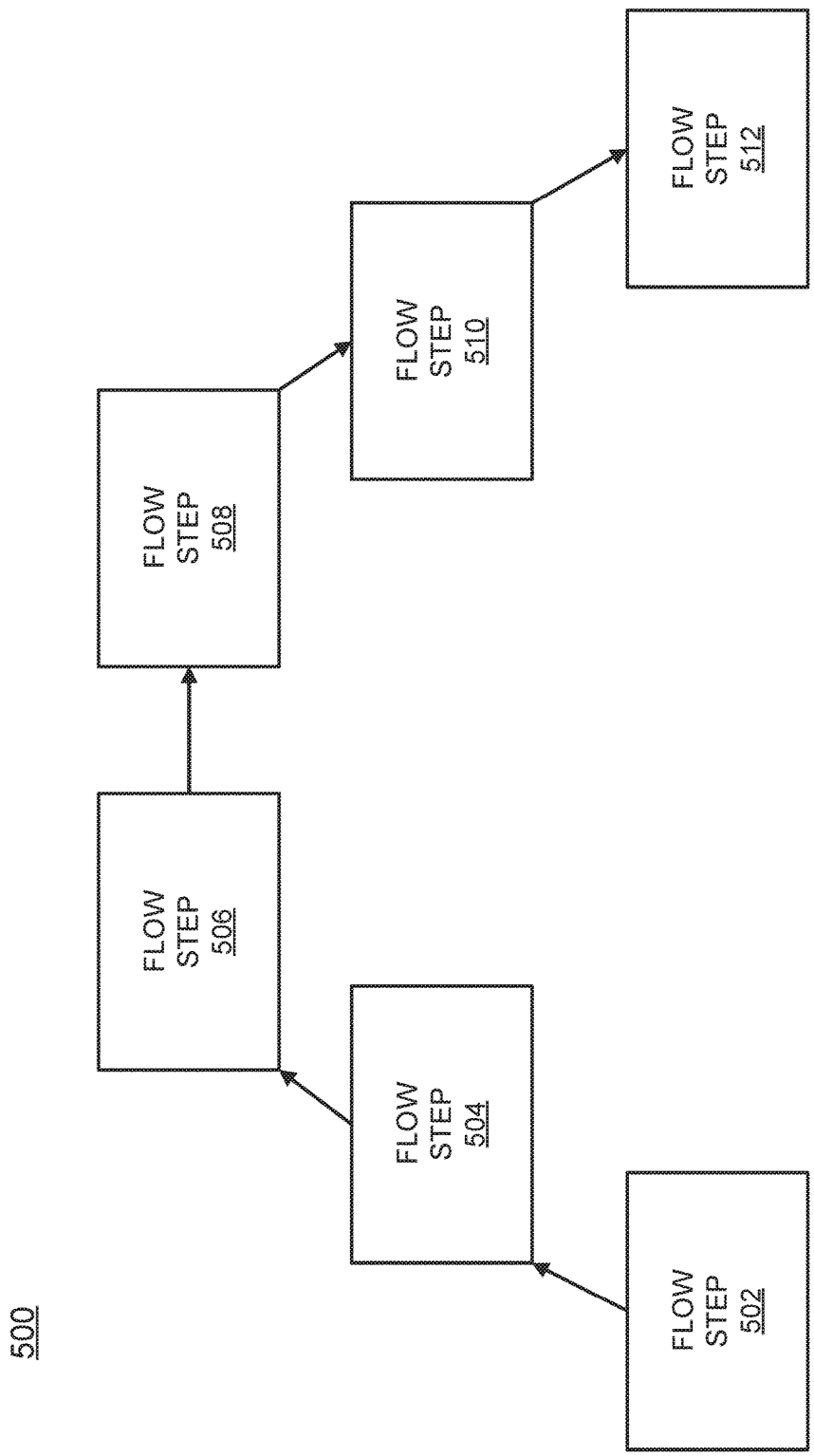
FIG. 5 illustrates a flow through the online web service depicted in FIG. 1.

FIG. 5 illustrates a flow 500 through the online web service 106 by a user. The flow 500 can represent a sequence of actions or activities by the user as they interact with the online web service 106. As shown in FIG. 5, the flow 500 can include flow steps 502-510 but is not so limited. Each flow step can represent an activity of the user such as, for example, selection of a link, selection of a webpage, selection of an action, selection of a menu, a copy and/or past operation, a scroll operation, a mouse movement operation, a data entry operation, etc. In various embodiments, any action or activity by the user in relation to interacting with the online web service 106 can be represented by one of the flow steps 502-510.

As an example, flow step 502 can represent a first webpage presented to the user by the online web service 106 after the user enters a valid username and password. Flow step 504 can represent a second webpage presented to the user by the online web service 106. The second webpage can be presented to the user in response to the user selecting or clicking on a link presented on the first webpage from flow step 502. According to the techniques disclosed herein, the remote computing device 104 can monitor and store data indicative of the flow step 502 and 504. In various embodiments, the remote computing device 104 can store data indicative of the first webpage, the second webpage, the action of the user to select the second webpage (e.g., what link from the first website was selected), the movement of the mouse by the user on the first webpage, the time between being presented the first webpage and the selection of the link to request the second webpage, etc.

Flow step 506 can represent a third flow step. As an example, flow step 506 can represent the selection of a menu on the second webpage. The menu can be a hidden menu that is revealed when the user, for example, hovers the mouse over a particular area of the second webpage or clicks on a certain area of the second webpage. Flow step 508 can represent a fourth flow step. The flow step 508 can represent the selection of a particular element of the menu by the user. For example, the menu presented in flow step 506 can provide a number of selectable choices to the user. Flow step 508 can represent the movement of the mouse of the user and the selection of a particular menu choice by the user. As with flow steps 502 and 504, data indicative of all user activity related to flow steps 506 and 508 can be stored by the remote computing device 104 including a time at which each user action is made (or a time between each action).

Flow step 510 can represent a third webpage presented to the user based on the selection of the user in flow step 508. As an example, flow step 510 can represent a webpage have one or more fields to be filled out by the user. The user's process for entering data into the fields—e.g., by pasting data into the fields, typing the data into the fields, etc. —can be monitored and data indicative of the same can be stored by the remote computing device 104. Additional information such as the time it takes the user to enter the data for each field, all fields in total, any mistyping, etc. can be stored by the remote computing device 104.

Flow step 512 can represent a termination of a session with the online web service 106 by the user. Flow step 512 can represent a particular route for the user to end the session such as, for example, timing out or activating selecting a mechanism to terminate the session. The remote computing device 104 can store data indicative to the flow step 512 including an action of the user to terminate the session with the online web service 106 and a total time spent with the online web service 106.

The user flow 500 can represent a particular flow of the user when interacting with the online web service 106. The user flow 500 can be one of a number of users flows used by the remote computing device 104 to generate a model for the user. The user flow 500 can vary based on the type of the user device 102 used by the user to access the online web service 106. Data indicative of flows for each user of the online web service 106 can be monitored and stored by the remote computing device and categorized for each user based on the type of device used by a particular user. The remote computing device 104 can use the stored information to generate one or more models per user—either unique and/or customized for each user or based on a group model assigned to two or more users.

Once the model or models for a user are developed, the flow 500 can represent a sequence of operations by a user that is then compared to the developed model. If the flow 500 deviates from the model for a user, the remote computing device 104 can flag the flow 500 as possibly unauthorized and/or fraudulent. If the flow 500 is determined to represent typical behavior of the user (e.g., the flow 500 fits the model for the user) and is therefore categorized as operations performed by an authorized user, then the flow 500 can be used to further refine and/or develop the model for the user.

Figure 6:
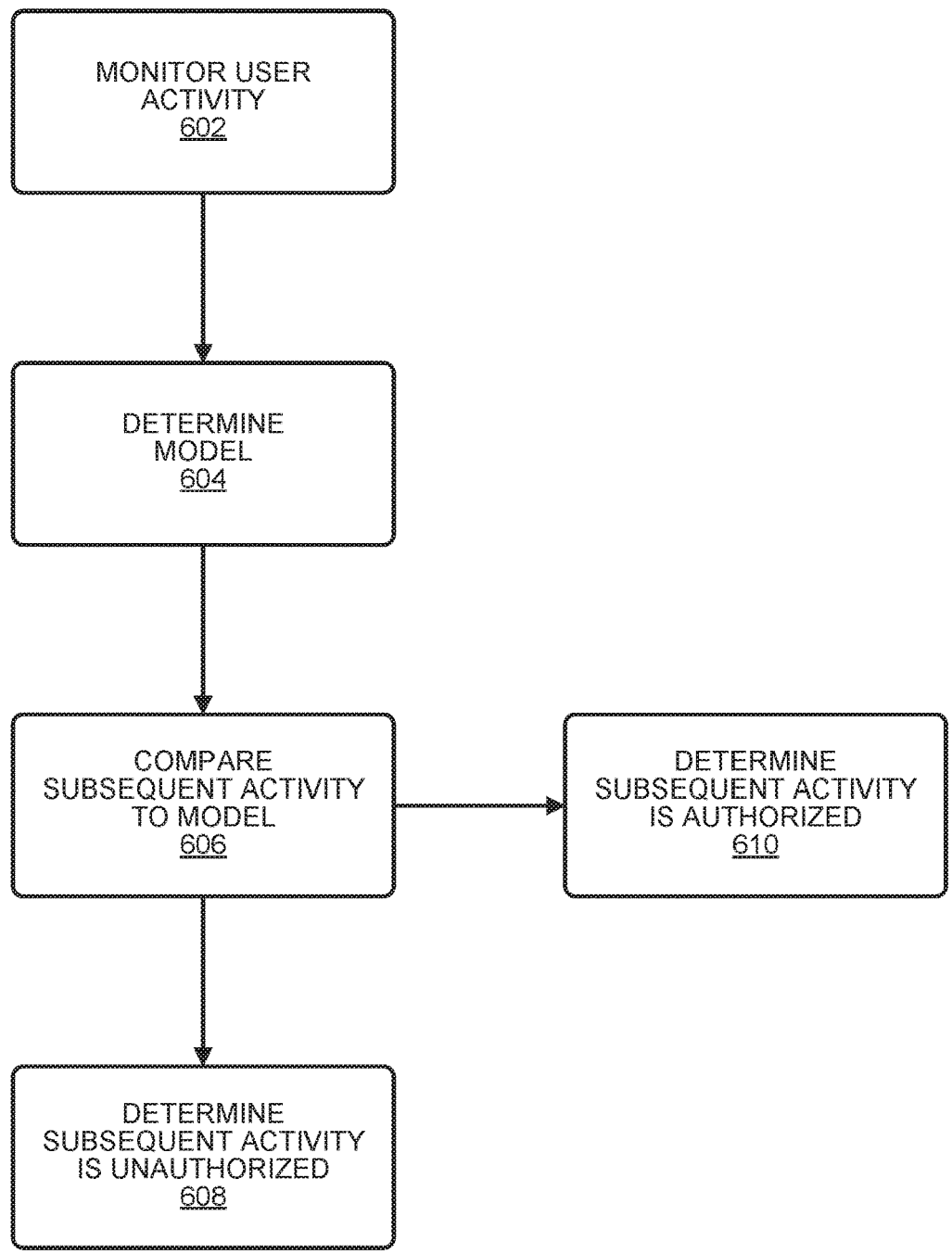
FIG. 6 illustrates a first logic flow.

FIG. 6 illustrates an example of a logic flow 600 that may be representative of a computing device detecting unauthorized user access on an online web service by way of user flow. For example, the logic flow 600 may be representative of operations that may be performed in various embodiments by the remote computing device 104 in the operating environment 100 of FIG. 1.

At 602, the remote computing device 104 can monitor and track activity of a user interacting with the online web service 106. The remote computing device 104 can store data indicative of each action performed by the user in interacting with the online web service 106. In various embodiments, the remote computing device 104 can store data indicative of each link selected by the user. The links selected by the user can be links to a requested webpage, requested menu, form, or any other data presented by the online web service. In various embodiments, the remote computing device 104 can store data indicative of each form or data field filled out by the user. In various embodiments, the remote computing device 104 can store data indicative of a time spent by the user on each webpage, a time between each selected link or requested action, and/or any other measure of time between any presentation by the online web service 106 to measure a time spent by the user on any individual component of the online web service 106 or a total time spent interacting with the online web service 106. In various embodiments, the remote computing device 104 can store data indicative of any data manipulation operations performed by the user (e.g., copy and paste operations), any mouse movements (including data indicative of a speed or smoothness of mouse movements), scrolling operations, and/or any other interactions the user may have with the online web service 106.

The monitoring, tracking, and storing operations at 602 by the remote computing device 104 can occur over multiple distinct sessions over the user interacting with the online web service 106. Each distinct session can include the user logging into the online web service 106 as an authorized user and terminating the authorized session with the online web service 106 (either intentionally or unintentionally). The remote computing device 104 can also host the online web service 106 such that the remote computing device 104 responds to the requested actions of the user as the user interacts with the online web service 106.

At 604, the remote computing device 104 can determine a model of a flow of the user through the online web service. The remote computing device 104 can determine the model based on the data stored at 602. In various embodiments, the remote computing device 104 can determine a model for the user based on, for example, the links selected by the user over the multiple distinct sessions with the online web service, the time between each selected link, and/or the data fields selected by the user for data entry.

The remote computing device 104 can determine a different model for the user based on each different type of the user device 102 used by the user to interact with the online web service 106. For example, a first model for the user can be determined based on the user using a mobile computing device (e.g., a smartphone) to interact with the online web service 106 and a second model for the user can be determined based on the user using a desktop computing device to interact with the online web service 106.

For each model determined for a user, the model determined by the remote computing device 104 can be a unique model assigned to a specific user or can be a group model assigned to two or more users. In various embodiments, the flow of the user on the online web service 106 can closely follow the flow of another user of the online web service 106. Accordingly, a same model of user flow can be assigned to each of these users.

The model determined by the remote computing device 104 can be developed and/or generated in a number of manners. In various embodiments, the model can be developed based on artificial intelligence (AI) and/or machine learning (ML). In various embodiments, the model can be developed based on a recurrent neural network (RNN). Under such scenarios, in various embodiments, an RNN (or other AI or ML modeling system) can be provided with various flows of the user through the online web service 106 (e.g., as correct flows based on data stored at 602) as well as various flows of other users through the online web service 106 (e.g., as incorrect flows based on data stored at 602 for other users). In this way, the RNN or other modeling system may develop a model based on recognizing mannerisms of the user as distinguished from mannerisms or behaviors of other users of the online web service 106. A model of user flow can then be generated based on this training process.

In various embodiments, a statistical probability model and/or state model can be developed for the user by the remote computing device 104. For example, the statistical probability that a user clicks on a certain link, clicks on a particular sequence of links, or selects a certain data field to enter data into can be developed based on the data monitored, tracked, and stored at 602. In this way, a measure of a likelihood of any action by the user or a next action can be determined. In various embodiments, the determined likelihoods can be compared to one or more thresholds to determine if a certain selected action is authorized or not and/or if the action fits another user model in comparison to the user's model. In various embodiments, a count of a number of deviations from an expected action of the user can be maintained and used to determine unauthorized activity on the online web service 106.

At 606, one or more models for the user have been determined. At 606, subsequent activity by the user (or an individual that gains access to the online web service 106 using logon credentials of the user) on the online web service 106 can occur. During the user's subsequent activity on the online web service 106, the subsequent activity can be compared to the user model determined from the user at 604. The model used for comparison to the user's subsequent activity can be any number of models assigned to the user and can vary, for example, based on the type of the user device 102 used by the user.

A comparison of the user's interaction with the online web service 106—for example, links selected by the user, time between selected links, fields selected by the user to be filled in with data by the user, etc. (e.g., any and all activity tracked, monitored, and/or stored at 602)—can be compared to the model of the flow of the user determined at 604.

When the user's subsequent activity at 606 in relation to interacting with the online web service 106 deviates from the model determined at 604, then the remote computing device 104 can determine at 608 that the subsequent user activity is unauthorized and/or fraudulent. At 608, the remote computing device 104 can determine that the user activity is originating from an individual other than the correct individual. If the user's subsequent activity at 606 in relation to interacting with the online web service 106 fits with the model determined at 604, then the remote computing device 104 can determine at 610 that the subsequent user activity is authorized.

In various embodiments, at 608, the remote computing device 104 can determine the subsequent user activity is unauthorized if the subsequent user activity fits another model better (e.g., for another user) than the model for the particular user. In various embodiments, at 608, the remote computing device 104 can determine the subsequent user activity is unauthorized if a user performs an action (e.g., selection of a link or selection of a sequence of links) that has a likelihood that is low such that, for example, the likelihood is below a threshold. Accordingly, when the likelihood of the action is below a threshold, the remote computing device 104 can determine that the action is unlikely to be performed by the user, and thereby flag the activity as likely being performed by an individual other than the user and/or unauthorized or fraudulent. In various embodiments, a statistical analysis can be performed that determines the subsequent user activity has a higher probability of fitting another user model than the model assigned to the user whose activity is being evaluated.

In various embodiments, as described herein, at 608 a temporary block or hold on access can be administered during which the user can be requested to undergo an authentication process such as, for example, a two-factor authentication. In doing so, activity that is actually conducted by the authorized user can undergo a second check to verify whether the suspicious activity is being performed by the user or not. In various embodiments, if the two-factor authentication process is successful, the full access to the user can be restored. If the two-factor authentication is not successful, then a full revocation or blocking of access can be administered.

Figure 7:
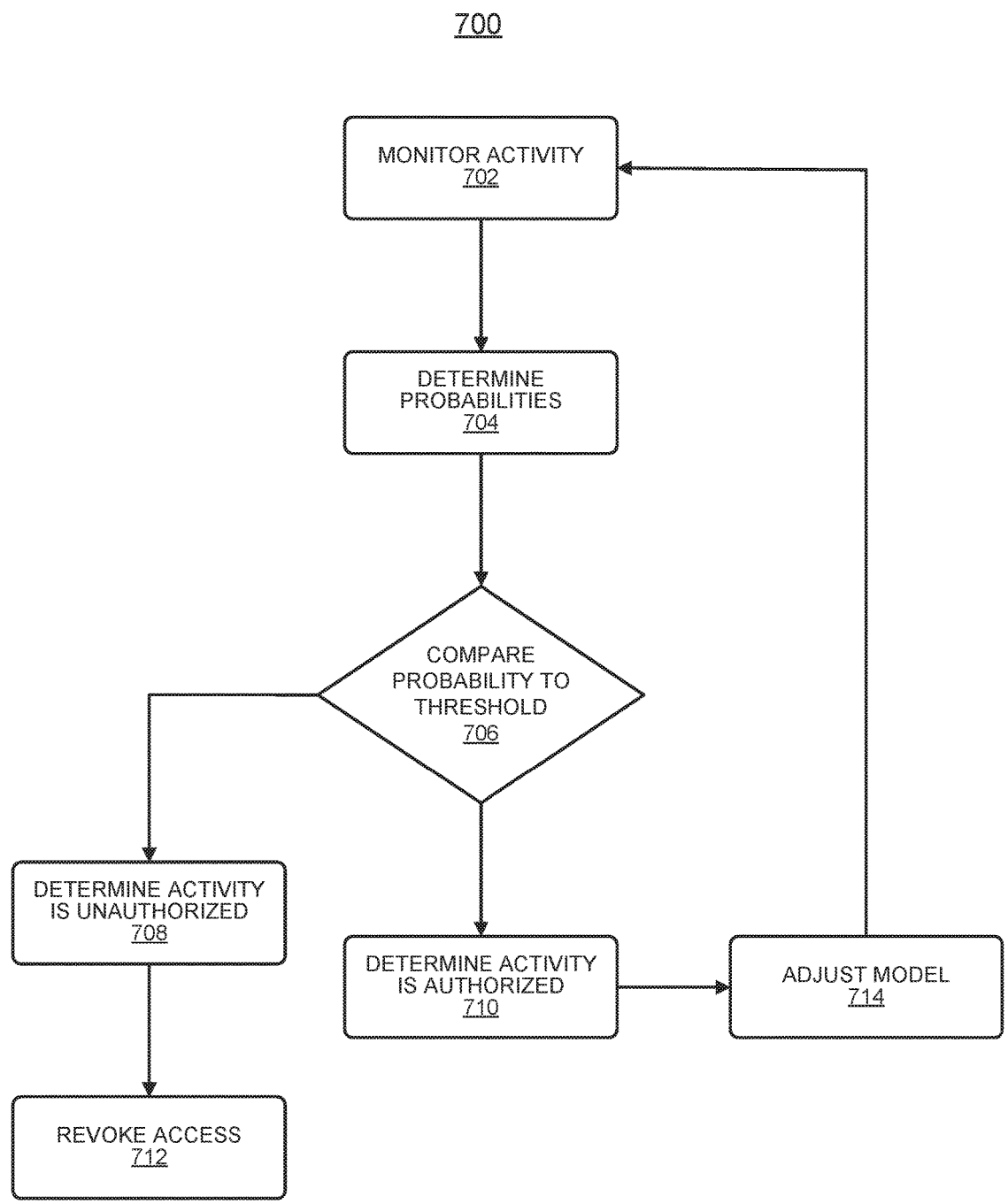
FIG. 7 illustrates a second logic flow.

FIG. 7 illustrates an example of a logic flow 700 that may be representative of a computing device detecting unauthorized user access to an online be service by way of user flow. For example, the logic flow 700 may be representative of operations that may be performed in various embodiments by the remote computing device 104 in the operating environment 100 of FIG. 1. The logic flow 700 can represent a particular implementation of certain portions of the logic flow 600 of FIG. 6 and/or of operations implemented by the remote computing device 104 to detect access to the online web service 106 by an unauthorized user.

At 702, the remote computing device 104 can monitor activity of the user on the online web service and can store data indicative of any actions by the user in interacting with the online web service. In various embodiments, the data can be indicative of any links selected by the user, the time elapsed between a selection of any links, and/or any fields selected by the user for filing out by data entry. Any other user activity or actions requested by or performed by the user in relation to interacting with the online web service 106 as described herein can be monitored by the remote computing device 104 and data indicative of the same can be stored.

At 704, the remote computing device 104 can determine a probability of a specific action or set of actions that the user may take in interacting with the online web service 106. For example, the user may be presented with a first webpage that includes a number of links the user can select. Based on the model determined for the user, the remote computing device 104 can assign a likelihood that the user selects a particular link available on the webpage. For example, based on prior user interaction with the online web service 106, it can be determined that a first link has an 85% likelihood of being clicked by the user while a second link has only a 5% likelihood of being clicked by the user, with both links presented on the current webpage presented to the user. At 704, the user can select a next action including, for example, selecting between one of the two links.

At 706, the remote computing device 104 can compare the likelihood assigned to the link selected by the user to a threshold. The threshold can be based on the model determined for the user. If the likelihood or probability assigned to the selected link is less than the predetermined threshold, then, at 708, the remote computing device can determine that the selection of the link was made by an individual that is not the actual authorized user at 708 (e.g., the action does not fit the model). If the likelihood or probability assigned to the selected link is greater than the predetermined threshold, then, at 710, the remote computing device 104 can determine that the selection of the link was made by an individual that is the actual authorized user (e.g., the action does fit the model).

If a user at 708 is determined to be unauthorized, then at 712 the remote computing device 104 can determine to revoke access to the online web service 106 through the use of the credentials (e.g., user name and password or other authentication information/mechanism used by the online website service 106) associated with the user being monitored in the logic flow 700.

In various embodiments, before revoking access, the remote computing device 104 can first request the user to undergo a verification or authentication process to ensure the suspected activity flagged as unauthorized is indeed truly not being performed by the actual authorized user. Accordingly, the remote computing device 104 can contact the user and request the user to undergo an authentication process such as, for example, a two-factor authentication process. If the process is successful, then access will not be revoked. If the process is unsuccessful, then full revocation of access can be administered.

If a user at 710 is determined to be authorized, then at 714 the remote computing device 104 can use the information regarding the user's interaction with the online web service 106 (e.g., the link selection by the user at 704) to adjust and/or refine the model for the user. Adjustment of the model can include adjusting a threshold used in 706 for comparison operations and/or adjustment to likelihoods of certain actions associated with certain links in 704.

Further, subsequent to 714, the remote computing device 104 can continue to monitor and evaluate the user's interactions with the online web service by repeating 702-706 as shown in FIG. 7.

Figure 8:
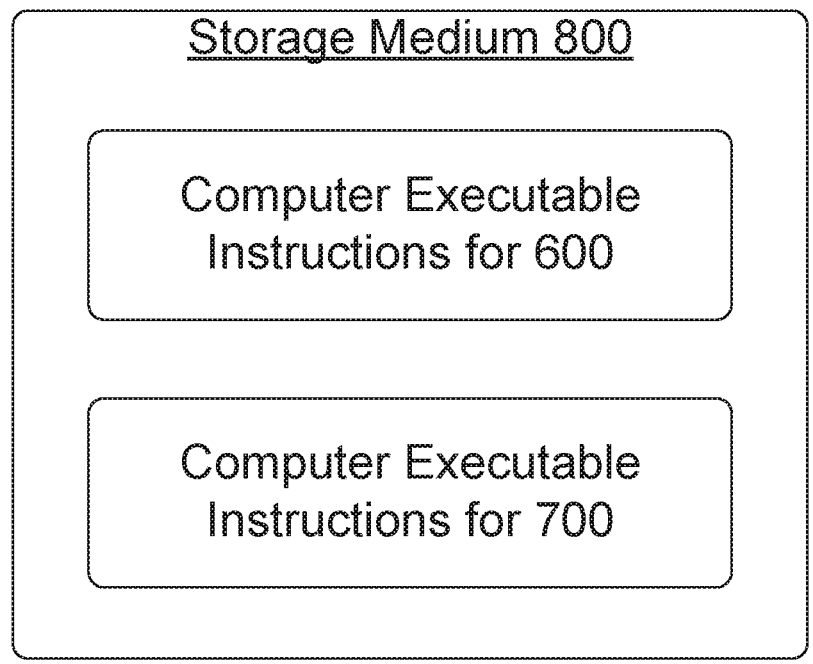
FIG. 8 illustrates a storage medium.

FIG. 8 illustrates a storage medium 800. Storage medium 800 may represent an implementation of the storage device 404. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as the logic flow 600 of FIG. 6 and/or the logic flow 700 of FIG. 7. In various embodiments, storage medium 800 can store computer-executable instructions, such as computer-executable instructions to implement any of the modules 406, 408, 410, and 412 of FIG. 4, or any portion thereof. Examples of a computer-readable storage medium or machine-readable storage medium can include any tangible media capable of storing electronic data. Examples of computer-executable instructions can include any type of computer readable code.

Figure 9:
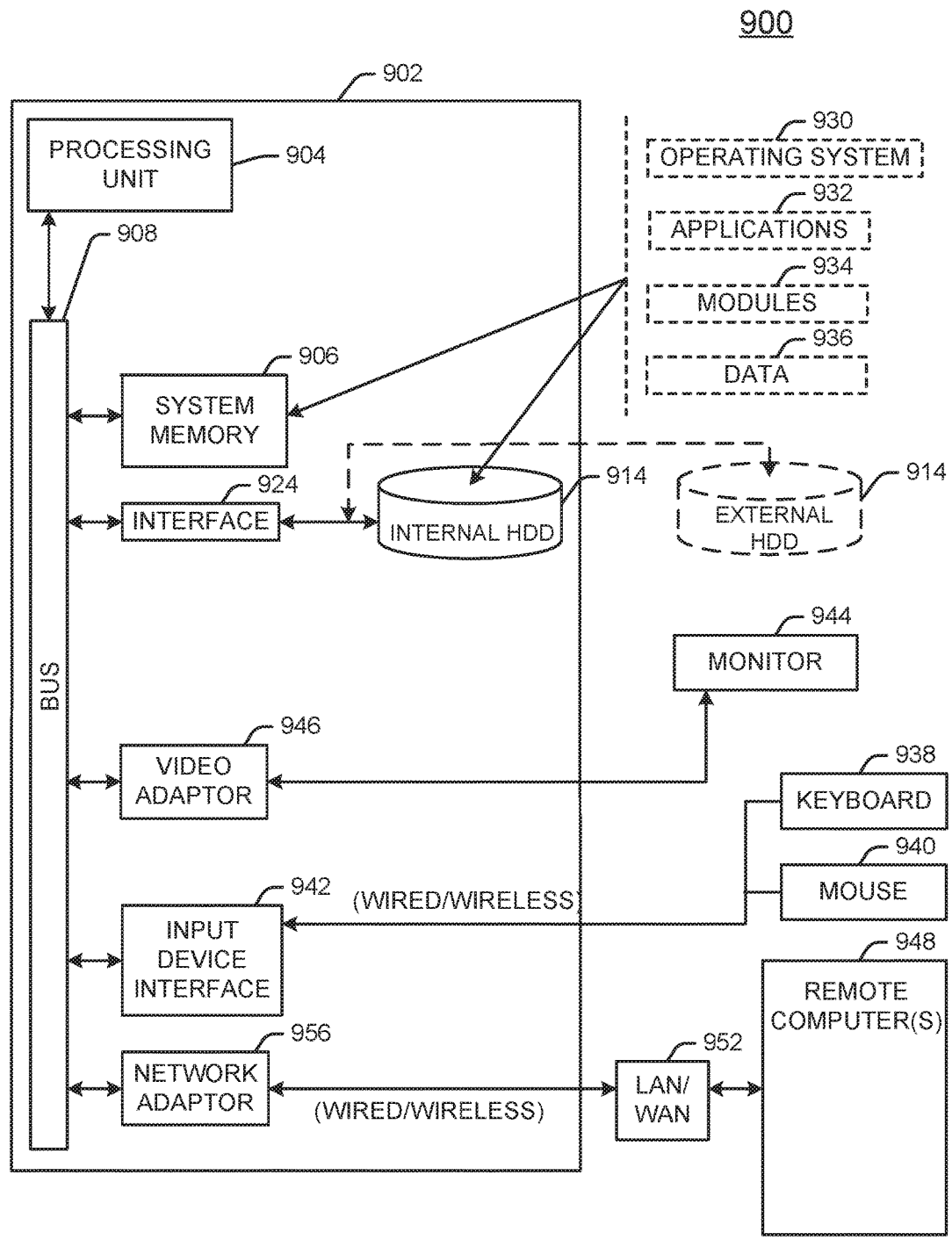
FIG. 9 illustrates a computing architecture.

FIG. 9 illustrates a computing architecture 900 that can implement various embodiments described herein. In various embodiments, the computing architecture 900 can comprise or be implemented as part of an electronic device. In various embodiments, the computing architecture 900 can represent an implementation of the user device 102. In various embodiments, the computing architecture 900 can represent an implementation of the remote computing device 104 for detecting unauthorized access to an online web service based on user flow.

The computing architecture 900 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures.

The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924.

In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

Figure 10:
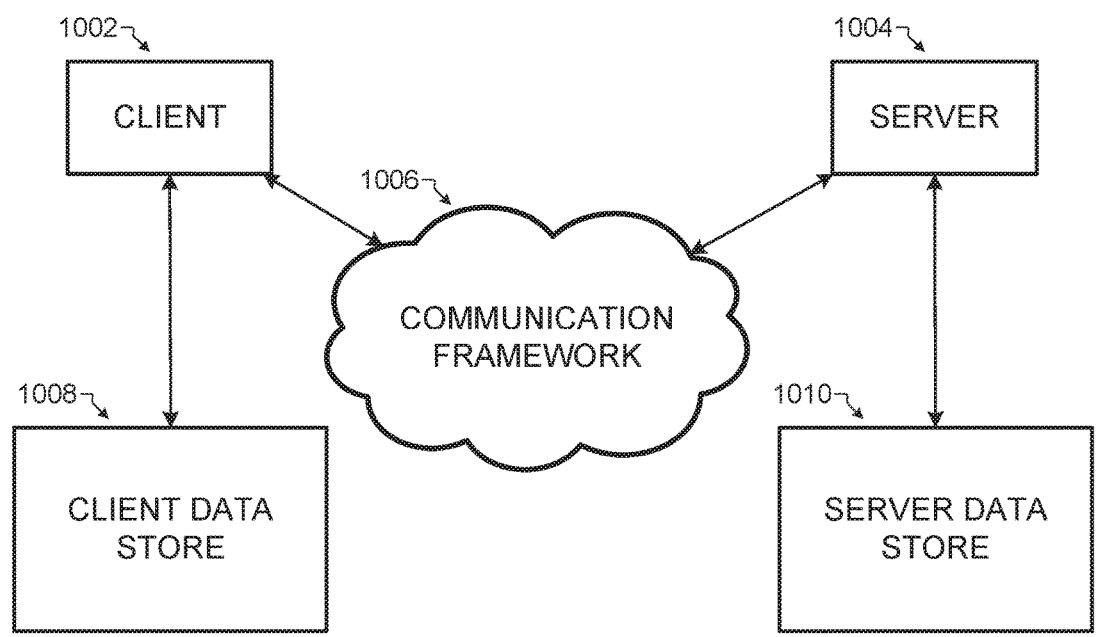
FIG. 10 illustrates a communication architecture.

FIG. 10 illustrates a block diagram of a communication architecture 1000. The communication architecture 1000 can implement various embodiments described herein. As shown in FIG. 10, the communication architecture 1000 comprises one or more clients 1002 and servers 1004. The client 1002 can represent an implementation of the user device 102 and/or use of the user device 102 to access the online web service 106. One of the servers 1004 can represent an implementation of the remote computing device 104 and/or operation of the remote computing device 104 to provide the online web service 106 and/or the authentication techniques using user flow as described herein.

The client 1002 and the server 1004 can be operatively connected to a client data store 1008 and a server data store 1010, respectively, that can be employed to store information local to the respective client 1002 and server 1004. In various embodiments, the server 1004 can implement one or more of logic flows or operations described herein and/or any of the functions and features described in relation to remote computing device 104.

The client 1002 and the server 1004 can communicate data or other information between each other using a communication framework 1006. The communications framework 1006 can implement any known communications technique or protocol. The communications framework 1006 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1006 can operate over any communication media according to any networking technology including any wired or wireless communications standard or protocol, or any combination thereof.

The following set of examples pertain to further embodiments.

Example 1 is an apparatus comprising a storage device and logic, at least a portion of the logic implemented in circuitry coupled to the storage device, the logic to receive, at a website, selections of links by a user of the website, store data indicative of each selected link and a time between each link selection over a plurality of distinct sessions on the website by the user, determine a model of a flow of the user through the website based on the stored data indicative of the selected links and the time between each link selection, compare the model of the flow of the user through the website to subsequent user activity on the website including a sequence of link selections, determine the subsequent user activity on the website is unauthorized when the subsequent user activity deviates from the model of the flow of the user through the website, and revoke access to the user to the website based on the determination the subsequent user activity on the website is unauthorized.

Example 2 is an extension of Example 1 or any other example disclosed herein, the model of the flow of the user through the website to comprise a customized model unique to the user.

Example 3 is an extension of Example 1 or any other example disclosed herein, the model of the flow of the user through the website to comprise a group model assigned to a cluster of users of the website.

Example 4 is an extension of Example 1 or any other example disclosed herein, the logic to receive an indication of a type of computing device used by the user to access the website.

Example 5 is an extension of Example 4 or any other example disclosed herein, wherein the model of the flow of the user through the website is based on the type of computing device used by the user to access the website.

Example 6 is an extension of Example 5 or any other example disclosed herein, wherein the type of computing device is one of a mobile computing device, a tablet computing device, and a desktop computing device.

Example 7 is an extension of Example 1 or any other example disclosed herein, the model of the flow of the user through the website determined based on a specific order of the selections of the links.

Example 8 is an extension of Example 1 or any other example disclosed herein, the logic to receive an indication of each form filled in by the user over the plurality of distinct sessions on the website, to store each indication of each form, and to determine the model of flow by the user through the website based on the stored indication for each form.

Example 9 is an extension of Example 1 or any other example disclosed herein, the model of the flow of the user through the website to comprise a stored value representing a likelihood a particular sequence of links is selected by the user.

Example 10 is an extension of Example 1 or any other example disclosed herein, the determination the subsequent user activity on the website is unauthorized to comprise comparing a value representing a likelihood of the user requesting the sequence of link selections to a threshold.

Example 11 is a method comprising receiving, at a website, selections of links by a user of the website, storing data indicative of each selected link and a time between each link selection over a plurality of distinct sessions on the website by the user, determine a customized unique model of a flow of the user through the website based on the stored data indicative of the selected links and the time between each link selection, comparing the customized unique model of the flow of the user through the website to subsequent user activity on the website including a sequence of link selections, determining the subsequent user activity on the website is unauthorized when comparison of the subsequent user activity to the model of the flow of the user through the website indicates the user is not responsible for the subsequent user activity.

Example 12 is an extension of Example 11 or any other example disclosed herein, further comprising determining the customized unique model of the flow of the user through the website based on an order of the selections of the links.

Example 13 is an extension of Example 11 or any other example disclosed herein, further comprising receiving, at the website, requests for data manipulation operations performed by the user on the website, storing data indicative of the requested data manipulation operations, and determining the customized unique model of the flow of the user through the website based on the stored data indicative of the requested data manipulation operations performed by the user.

Example 14 is an extension of Example 11 or any other example disclosed herein, further comprising receiving, at the website, an indication of a data field filled in by the user on the website, storing the indication of the data field filled in by the user, and determining the customized unique model of the flow of the user through the website based on the stored indication of the field filled in by the user.

Example 15 is an extension of Example 12 or any other example disclosed herein, determining the subsequent user activity on the website is unauthorized when a first value representing a first likelihood the subsequent user activity fits a customized unique model of a flow of another user of the website is higher than a second value representing a second likelihood the subsequent user activity fits the customized unique model of the flow of the user through the website.

Example 16 is an extension of Example 11 or any other example disclosed herein, further comprising updating the customized unique model of the flow of the user through the website based on the subsequent user activity when the subsequent user activity is determined to not be unauthorized.

Example 17 is at least one non-transitory computer-readable medium comprising a set of instructions that, in response to being executed on a computing device, cause the computing device to monitor a flow of a user on a website over a plurality of distinct sessions on the website by the user, categorize the user into a group of users based on the monitored flow of the user on the website, assign a shared model of user behavior to the user based on the categorization of the user into the group of users, compare the shared model of user behavior to subsequent activity on the website, and determine subsequent activity on the website is unauthorized based on the comparison of the shared model of user behavior to the subsequent activity on the website.

Example 18 is an extension of Example 17 or any other example disclosed herein, the flow of the user to comprise a sequence of links selected by the user on the website.

Example 19 is an extension of Example 17 or any other example disclosed herein, the flow of the user to comprise a sequence of types of data fields filled in by the user on the website.

Example 20 is an extension of Example 17 or any other example disclosed herein, the flow of the user to comprise user activity captured by a server hosting the website.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An apparatus, comprising:
a storage device; and
logic, at least a portion of the logic implemented in circuitry coupled to the storage device, the logic to:
receive, at a website, selections of links by a first user of the website;
store data indicative of each selected link and a time between each link selection over a plurality of distinct sessions on the website by the first user;
determine a first customized unique model of a flow of the first user through the website based on the stored data indicative of the selected links and the time between each link selection;
compare the first customized unique model of the flow of the first user through the website to subsequent first user activity on the website including a sequence of link selections;
determine the subsequent first user activity on the website is unauthorized when the subsequent first user activity deviates from the first customized unique model of the flow of the first user through the website; and
revoke access to the first user to the website based on the determination the subsequent first user activity on the website is unauthorized, wherein the subsequent first user activity is determined unauthorized when a first value representing a first likelihood the subsequent first user activity fits a second, different customized unique model of a flow of a second, different user of the website is higher than a second value representing a second likelihood the subsequent first user activity fits the first customized unique model of the flow of the first user through the website.

2. The apparatus of claim 1, the logic to receive an indication of a type of computing device used by the first user to access the website.

3. The apparatus of claim 2, wherein the first customized unique model of the flow of the first user through the website is based on the type of computing device used by the first user to access the website.

4. The apparatus of claim 3, wherein the type of computing device is one of a mobile computing device, a tablet computing device, and a desktop computing device.

5. The apparatus of claim 1, the first customized unique model of the flow of the first user through the website determined based on a specific order of the selections of the links.

6. The apparatus of claim 1, the logic to receive an indication of each form filled in by the first user over the plurality of distinct sessions on the website, to store each indication of each form, and to determine the first customized unique model of flow by the first user through the website based on the stored indication for each form.

7. The apparatus of claim 1, the first customized unique model of the flow of the first user through the website to comprise a stored value representing a likelihood a particular sequence of links is selected by the first user.

8. The apparatus of claim 1, the determination the subsequent first user activity on the website is unauthorized to comprise comparing a value representing a likelihood of the first user requesting the sequence of link selections to a threshold.

9. A method, comprising:
receiving, at a website, selections of links by a first user of the website;
storing data indicative of each selected link and a time between each link selection over a plurality of distinct sessions on the website by the first user;
determining a first customized unique model of a flow of the first user through the website based on the stored data indicative of the selected links and the time between each link selection;
comparing the first customized unique model of the flow of the first user through the website to subsequent first user activity on the website including a sequence of link selections; and
determining the subsequent first user activity on the website is unauthorized when comparison of the subsequent first user activity to the first customized unique model of the flow of the first user through the website indicates the first user is not responsible for the subsequent first user activity, wherein the subsequent first user activity is determined unauthorized when a first value representing a first likelihood the subsequent first user activity fits a second, different customized unique model of a flow of a second, different user of the website is higher than a second value representing a second likelihood the subsequent first user activity fits the first customized unique model of the flow of the first user through the website.

10. The method of claim 9, further comprising determining the customized unique model of the flow of the first user through the website based on an order of the selections of the links.

11. The method of claim 9, further comprising:
receiving, at the website, requests for data manipulation operations performed by the first user on the website;
storing data indicative of the requested data manipulation operations; and
determining the customized unique model of the flow of the first user through the website based on the stored data indicative of the requested data manipulation operations performed by the first user.

12. The method of claim 9, further comprising:
receiving, at the website, an indication of a data field filled in by the first user on the website;
storing the indication of the data field filled in by the first user; and
determining the customized unique model of the flow of the first user through the website based on the stored indication of the field filled in by the first user.

13. The method of claim 9, further comprising updating the customized unique model of the flow of the first user through the website based on the subsequent first user activity when the subsequent first user activity is determined to not be unauthorized.

14. At least one non-transitory computer-readable medium comprising a set of instructions that, in response to being executed on a computing device, cause the computing device to:
monitor a flow of a first user through a website over a plurality of distinct sessions on the website by the first user;
determine a first customized unique model of the flow of the first user through the website based on the monitored flow of the first user through the website;
compare the first customized unique model of the flow of the first user through the website to subsequent first user activity on the website; and determine the subsequent first user activity on the website is unauthorized when the subsequent first user activity deviates from the first customized unique model of the flow of the first user through the website, wherein the subsequent first user activity is determined unauthorized when a first value representing a first likelihood the subsequent first user activity fits a second, different customized unique model of a flow of a second, different user of the website is higher than a second value representing a second likelihood the subsequent first user activity fits the first customized unique model of the flow of the first user through the website.

15. The at least one non-transitory computer-readable medium of claim 14, the flow of the first user to comprise a sequence of links selected by the user on the website.

16. The at least one non-transitory computer-readable medium of claim 14, the flow of the first user to comprise a sequence of types of data fields filled in by the user on the website.

17. The at least one non-transitory computer-readable medium of claim 14, the flow of the first user to comprise user activity captured by a server hosting the website.

* * * * *